United States Patent [19]
Murphy

[11] 3,805,151
[45] Apr. 16, 1974

[54] DIRECT CURRENT RESISTANCE SCALE EXPANDER

[76] Inventor: John E. Murphy, 19 Phyllis Dr., Bethpage, N.Y. 11714

[22] Filed: Oct. 24, 1972

[21] Appl. No.: 299,827

[52] U.S. Cl. .................................. 324/62, 324/115
[51] Int. Cl. ............................................ G01r 27/02
[58] Field of Search .......................... 324/62 R, 115

[56] References Cited
UNITED STATES PATENTS

| | | | |
|---|---|---|---|
| 2,188,588 | 1/1940 | Antranikian | 324/62 R |
| 2,167,162 | 7/1939 | Terman | 324/115 |
| 2,891,219 | 6/1959 | Camp | 324/62 R |
| 2,995,704 | 8/1961 | Norgaard | 324/62 R |
| 3,054,055 | 9/1962 | Lubkin | 324/62 R X |
| 2,189,660 | 2/1940 | Boudreau | 324/115 X |

*Primary Examiner*—Stanley T. Krawczewicz
*Attorney, Agent, or Firm*—Carl Miller

[57] ABSTRACT

A device for electrically expanding an electric meter the device consisting of a circuit that is in series with the meter that is intended to be expanded; the circuit including a voltage source, a variable resistor and a fuse.

3 Claims, 4 Drawing Figures

DIRECT CURRENT RESISTANCE SCALE EXPANDER

This invention relates generally to electrical expanders. More specifically, it relates to a direct current resistance scale expander.

A principal object of the present invention is to provide a direct current resistance scale expander which is used to expand an electric ohm meter.

Another object is to provide a direct current resistance scale expander that is relatively easy to use.

Further objects of the invention will appear as the description proceeds.

To the accomplishment of the above and related objects, my invention may be embodied in the form illustrated in the accompanying drawings, attention being called to the fact, however, that the drawings are illustrative only, and that changes may be made in the specific construction illustrated and described within the scope of the appended claims.

Figure 1:
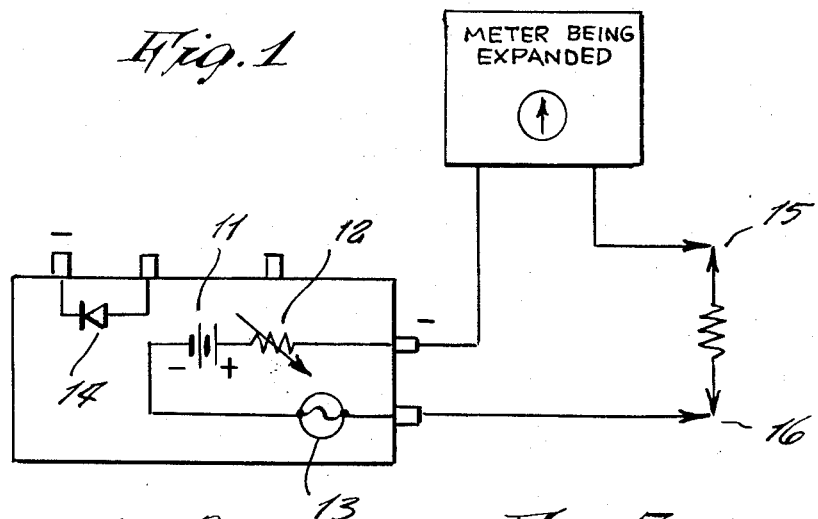
FIG. 1 is a diagram of the invention shown in series circuit with a meter that is intended to be expanded.

Referring now to the drawing in detail, the direct current resistance scale expander consists of a voltage source 11, a variable resistor 12 and a fuse 13, so to protect the meter which is being expanded.

It is to be noted that the voltage source of the present invention is in a series circuit with the meter which is being expanded. A person is obliged to determine if the common lead out of the meter that is to be expanded is a positive or negative lead. In order to do so, the diode 14 is used by reading its forward resistance.

The meter is initialized by placing leads 15 and 16 together, but first the item 12 and the ohms adjust on the meter are turned to a maximum resistance. Then the zero in is made.

The new top value of the resistance sacle is greater than the original top value by as many times the new total voltage is greater than the voltage in the multimeter being expanded.

Figure 2:
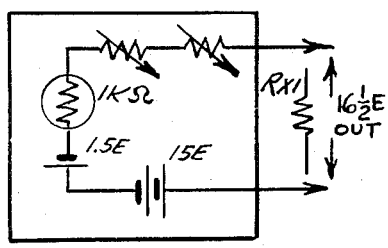
FIG. 2 and FIG. 3 are electrical diagrams giving illustrated examples to clarify the theory of operation of the present invention.
Figure 3:
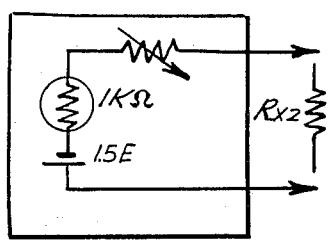

To better understand the invention, the reader is directed to FIGS. 2 and 3. FIG. 2 is the multimeter plus the present invention. It is to be regarded as a power supply. FIG. 3 shows the multimeter alone, and is also to be regarded as a power supply. FIG. 2 shows a 16½ Volt unit, while FIG. 3 shows a 1½ Volt unit. It is assumed in the example that the multimeter requires 0.001 amps at one volt for a full scale deflection; also for a ½ scale 0.0005 amps. are needed. This makes the resistance of the meter coil 1,000 ohms.

Now to determine multiplying facts:

If the meter is 1.5 volts and the voltage of the invention is 15 volts, then the voltage of the invention plus the voltage of the meter is 16½ E, 11 times the voltage of the meter alone, and the top resistance scale is multiplied accordingly by 11 times, thus a scale of $Rx = 10$ would become $RX = 110$.

Assume that one already short circuited the output terminals together and adjusted the resistor for 0.001 amperes. FIG. 2 would have an internal resistance of $$R \text{ equals } E/i$$

thus 16½ E/0.001 amps. equals 16,500 ohms. This is analogous to zeroing in an ohm meter.

FIG. 3 would have an internal resistance of $$R = E/I$$

thus 1½ E/0.001 amp. = 1,500 phms. ohms.

The following is a proof that Rx1 will result in 0.0005 amps, or ½ scale, flowing through the meter when it is 11 times $RX_2$ wherein $RX_2$ is such a value so as to give ½ scale reading. Thus is expanded the highest resistance scale on the multimeter.

In the case of the Eico multimeter 536–526, the highest range is R times 10. This invention circuit has been successfully tested on the above mentioned Eico meter.

For first step, find resistance value for $RX_2$ that will give 0.0005 amps. at 1½ volts. $R = E/I$. 1½/0.005 = 3,000 Ohms. Knowledge teaches that the internal resistance of FIG. 3 is 1,500 Ohms as it was set when shorted leads were adjusted for 0.001 Amps. Thus $RX_2 = 1,500$ Ohms.

For a second step, find the value of $RX_1$. $R=E/I$. 16½/.0005=33,000 Ohms. The internal resistance of FIG. 2 is 16,500 Ohms. Thus Rx1=33,000 − 16,500 which equals 16,500 Ohms. This is 11 times $RX_2$.

For second approach, leave the resistance set. At 0.0005 Amps. it is known that there will be a drop of 8.25 E due to the 16,500 Ohms internal resistance of FIG. 2. In the case of FIG. 3, there will be a drop of 0.75 volts due to the 1,500 Ohms internal resistance.

For FIG. 2 Rx1 = 8.25/0.0005 = 16,500 Ohms. $RX_2 = 0.75/0.0005 = 1,500$ Ohms.

Figure 4:
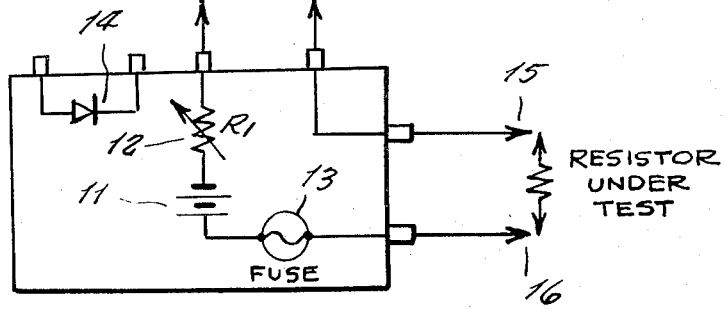
FIG. 4 is an electrical diagram of an alternate method of hook up.

In FIG. 4, there is an alternate method to connecting an ohm meter to the D. C. RESISTANCE SCALE EXPANDER. This alternate method in no way changes the electrical characteristics of the invention.

Note in FIG. 4 that this new hookup connects the two ohm meter leads direct to the invention and then two leads lead out to the item under test.

It is to be noted that the explanation theory stated in the foregoing text is simply a specific example so to indicate how the invention operates when used with a volt ohm meter. Thus if a person wishes to state a theory for use with SAY a VTVM, the above indicated theory will necessarily need to be expanded accordingly. The theory that is presented does however suggest the nature of its intrincacies in applying it to a VTVM, etc.

While various certain novel features of my invention have been shown and described and are pointed out in the annexed claims, it will be understood that various omissions, substitutions and changes in the forms and details of the device illustrated and in its operation can be made by those skilled in the art without departing from the spirit of the invention.

What I claim as new and desire to secure by letters Patent is:

1. A scale expander adapted for interconnection with a D.C. resistance measuring device of the type having an internal voltage source, an internal resistance and two output terminals of preset opposite polarities, said scale expander comprising in a first series arrangement, first input terminal means for connection to one of the output terminals of the measuring device, external voltage source means connected such that said first input terminal means is of a polarity opposite to the polarity of the output terminal to which it is connected, external variable resistance means, and first output coupling means, the amount of scale expansion being determined by the ratio of said external voltage source means to the internal voltage source and wherein said external variable resistance means can be adjusted to a resistance value which is a multiple of the internal resistance value by said ratio.

2. A scale expander as in claim 1 and further comprising, in a second series arrangement, second input terminal means for connection to the other of the output terminals of the measuring device, and second output coupling means.

3. A scale expander as in claim 1 and further comprising, in combination therewith, means for testing the polarities of the output terminals of the measuring device.

* * * * *